United States Patent
Weisbuch

(10) Patent No.: US 9,690,187 B2
(45) Date of Patent: Jun. 27, 2017

(54) SAMPLING FOR OPC MODEL BUILDING

(71) Applicant: GLOBALFOUNDRIES Inc., Grand Cayman (KY)

(72) Inventor: Francois Weisbuch, Dresden (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 251 days.

(21) Appl. No.: 14/678,008

(22) Filed: Apr. 3, 2015

(65) Prior Publication Data
US 2016/0161841 A1 Jun. 9, 2016

Related U.S. Application Data

(60) Provisional application No. 62/088,183, filed on Dec. 5, 2014.

(51) Int. Cl.
*G06F 17/50* (2006.01)
*G03F 1/36* (2012.01)

(52) U.S. Cl.
CPC ............ *G03F 1/36* (2013.01); *G06F 17/5072* (2013.01); *G06F 17/5081* (2013.01)

(58) Field of Classification Search
CPC ..... G03F 1/36; G06F 17/5072; G06F 17/5081

USPC ........................................................ 716/53
See application file for complete search history.

(56) References Cited

U.S. PATENT DOCUMENTS

| | | | |
|---|---|---|---|
| 8,887,105 B1* | 11/2014 | Bruguier | G03F 1/70 716/50 |
| 2011/0224956 A1* | 9/2011 | Ye | G03F 1/14 703/1 |
| 2012/0300054 A1* | 11/2012 | Mito | G01N 23/2251 348/79 |

* cited by examiner

*Primary Examiner* — Jack Chiang
*Assistant Examiner* — Brandon Bowers
(74) *Attorney, Agent, or Firm* — Ditthavong & Steiner, P.C.

(57) ABSTRACT

Methods for selecting the best measurement sites for OPC model calibration are disclosed. Embodiments include selecting a predetermined number, n, of structures representing an IC design layout eligible for SEM measurement; specifying an image parameter space of image parameters for the n structures; optimizing a redundancy in the image parameter space of measurement sites for the n structures; and calibrating an OPC model for the IC design layout based on the optimized redundancy.

8 Claims, 7 Drawing Sheets

Figure 2:
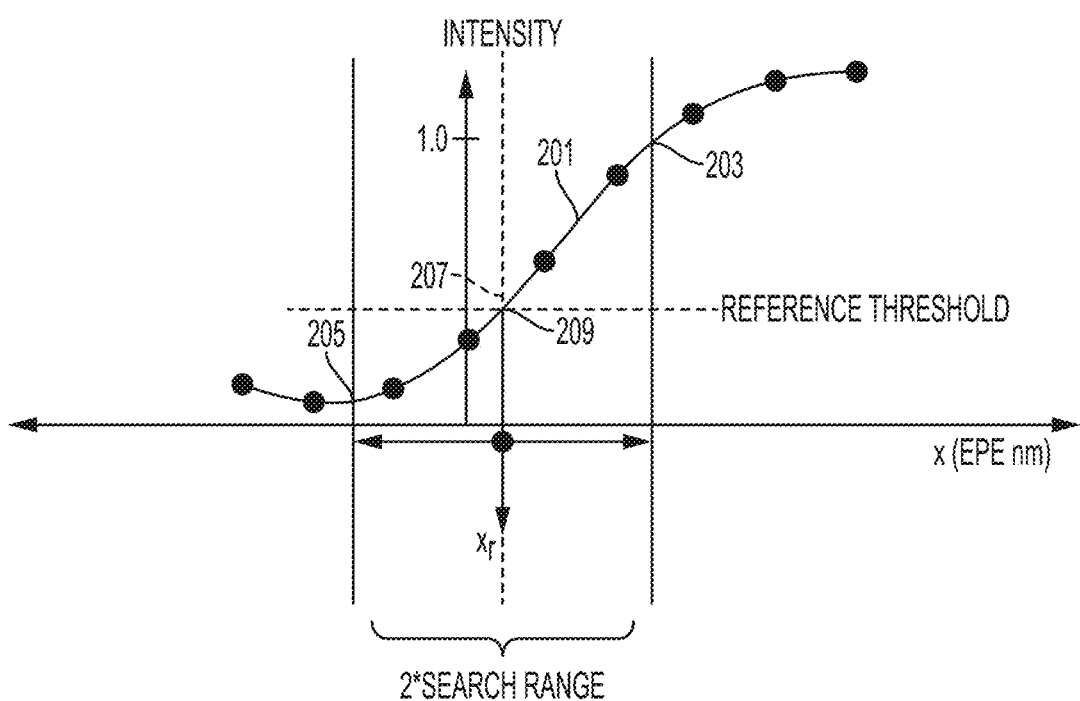

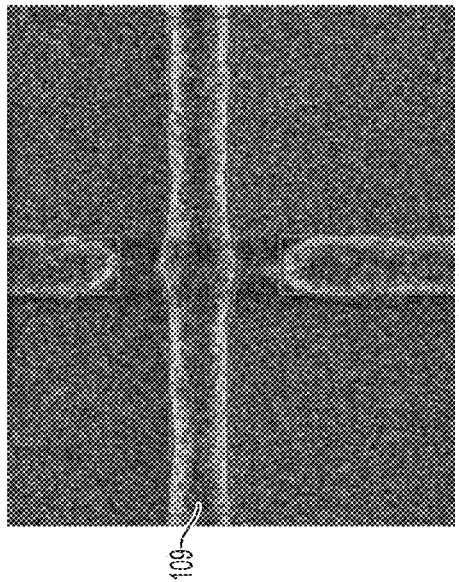
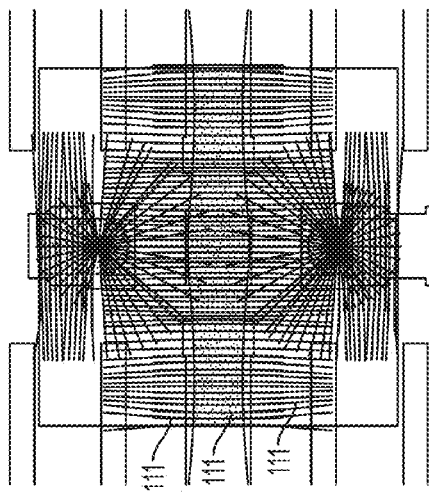
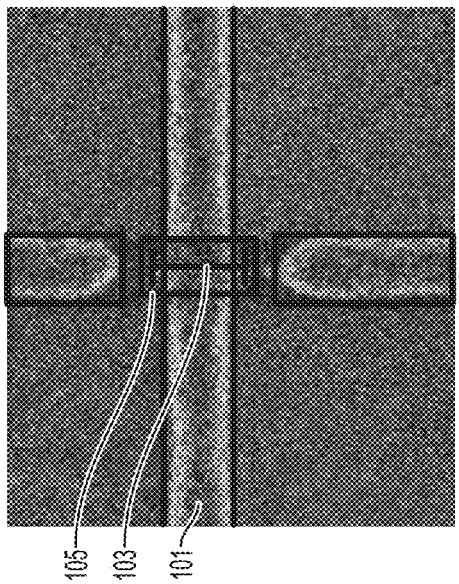
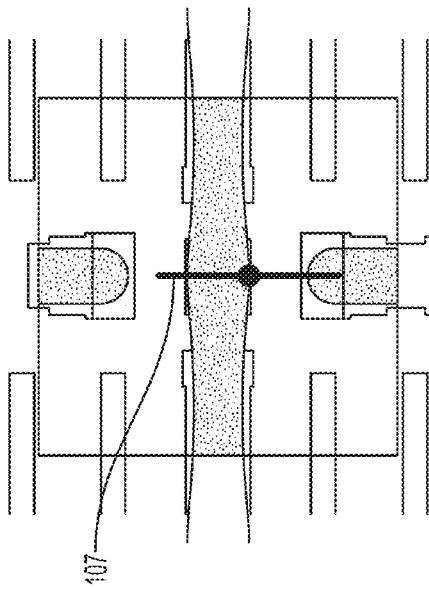
BACKGROUND FIG. 1A
BACKGROUND FIG. 1B
BACKGROUND FIG. 1C
BACKGROUND FIG. 1D

SAMPLING FOR OPC MODEL BUILDING

TECHNICAL FIELD

The present disclosure relates to Optical Proximity Correction (OPC) model building. The present disclosure is particularly applicable to selecting measurement sites for OPC model calibration.

BACKGROUND

State of the art photo lithography processes for integrated circuit (IC) manufacturing require OPC to transfer with high fidelity intended patterns onto a photoresist, to correct for optical distortion due to the diffraction of light going through the photomask during the photolithography process. OPC is based on optical and resist models to predict with high accuracy the way photomask shapes print after resist development.

The resist model is highly empirical and therefore requires careful calibration by precise measurement of the dimensions of well-chosen structures including test structures and structures that are critical to the design. Traditionally, a measurement or critical dimension (CD) is obtained for each scanning electron microscopy (SEM) image, and an equivalent simulation cutline is set at the center of the layout (perpendicular to the layout) to be simulated. For example, as illustrated in FIG. 1A, in a CD based metrology, each structure 101 gives rise to a single measurement 103 per image. The measurement is targeted at a metrology window 105, and the equivalent simulation cutline 107 (shown in FIG. 1C) is set perpendicular to the layout to derive the image parameters.

Since the number of structures that can be measured is limited (typically less than 1000), one challenge is to select structures that best represent the diversity of all possible full chip designs, as empirical models are not suited for extrapolating too far from the calibration space. In addition, another challenge is to minimize the redundancy within the selection to avoid overweighting specific structures and biasing the OPC model, thereby reducing the model's capacity to predict. These challenges are greatly increased when using SEM contour based metrology to calibrate OPC models, as illustrated in FIG. 1B, as each structure 109 supplies hundreds of measurements or sites per image, depending on the contour sampling (for example, sampling with a value of 1 to 10 nanometers (nm) which leads to hundreds of corresponding cutlines 111 perpendicular to the contours (187 cutlines shown in FIG. 1D), to derive the image parameters. Using SEM contours to calibrate the OPC model, it is common to deal with over 10,000 measurements for the calibration. Since each image gives more than one measurement, the ability to optimize the structure selection (inter-structure selection) is insufficient. In addition, selection of measurements within the selected structures of the image (intra-structure selection) must also be optimized.

Traditionally, the position of the simulation cutline to derive image parameters is centered at the edge of the layout to be simulated, where the layout can be the intended drawn layer or the photomask layer. However, the position of the cutline can then differ significantly from the resist edge. Furthermore, the accuracy of the measurement can hardly be promising when the layout is made of polygons with sharp corners that translate into round shapes in the resist. Thus, the simulation cutlines close to a corner tend not to be perpendicular to the resist edge, and the derived image parameters will not be accurate. A need therefore exists for increasing the accuracy of the measurements of each targeted structure, and optimizing the selection of the structure, to represent the shape of the photomask, for OPC model calibration.

SUMMARY

One aspect of the present disclosure is a method of optimizing weighting of sites available in an SEM data set.

Another aspect of the present disclosure is a method of selecting a predetermined number, n, of structures representing an IC design layout eligible for SEM measurement.

Another aspect of the present disclosure is a method of coarse selection followed by a fine selection of evaluation sites.

Additional aspects and other feature of the present disclosure will be set forth in the description which follows and in part will be apparent be those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: selecting a predetermined number, n, of structures representing an IC design layout, which is eligible for SEM measurements; specifying an image parameter space of image parameters for the n structure; optimizing a redundancy in the image parameter space of measurement sites for the n structures; and calibrating an OPC model for the IC design layout based on the optimized redundancy.

Aspects of the present disclosure include optimizing by assigning a weight to each site which is inversely proportional to the redundancy. Further aspects include determining the redundancy according to a symmetric and decreasing site density function. Other aspects include selecting the n structures representing an IC design layout eligible for SEM measurement by: calculating simulated contours of one or more structures representing IC design layout; calculating evaluation cutlines along the simulated contours; extracting one or more image parameters for the evaluation cutlines; overlaying the image parameter space with a grid of $a_1 \times a_2 \times \ldots \times a_y$ bins (where y represents a number of the image parameters extracted); mapping image parameters of all structures representing the IC design layout; determining for each non-empty bin whose structure contributes the most points to the bin; and selecting for each non-empty bin the determined structure. Additional aspects include wherein if a total number, x, of determined structures is less than n, changing $a_1$ through $a_y$, repeating the steps of determining which structure contributes the most points to each bin, and selecting the determined structures until x equals n. Another aspect includes the simulated contours being associated with a SEM metrology window. Further aspects include determining a number of the evaluation cutlines to calculate by sampling the simulated contours using a predetermined sampling value, which ranges from 1 to 10 nm.

Another aspect of the present disclosure includes a method including: calculating simulated contours of one or more structures representing an IC design layout; calculating evaluation cutlines along the simulated contours, each cutlines corresponding to an evaluation site; extracting one or more image parameters for the evaluation cutlines; inter-structure coarse selection followed by intra-selection fine selection of evaluation sites; and calibrating an OPC model for the IC design layout based on measurements at the selected evaluation sites.

Still other aspects include the inter-structure coarse selection including defining which structures are to be measured by SEM to form an SEM data set. A further aspect includes the intra-structure fine selection including defining the site density for a given point in the image parameter space. Other aspects include computing the site density using a symmetric and decreasing function. Still other aspects include the symmetric and decreasing function being a Gaussian or a Lorentzian function. Other aspects include calculating the density by calculating a density of other sites in its vicinity. Other aspects include the intra-structure fine selection including optimizing weighting of sites in the SEM data set. A further aspect includes optimizing weighting of sites including computing the weight of each site in inverse proportion to a density function. Another aspect includes associating the simulated contours with an SEM metrology window. Additional aspects include determining a number of the evaluation cutlines to calculate by sampling the simulated contours using a predetermining sample value, which ranges from 1 to 10 nm.

Another aspect of the present disclosure includes: calculating simulated contours of one or more structures representing an IC design layout; calculating evaluation cutlines along the simulated contours; extracting one or more image parameters for the evaluation cutlines; overlaying the image parameters with a grid of $a_1 \times a_2 \times \ldots \times a_y$ bins (where y represents a number of the image parameters extracted); mapping the image parameters of all structures representing the IC design layout onto the grid; determining for each non-empty bin which structure contributes the most points to the bin; selecting for each bin non-empty bin the determined structure; changing $a_1$ through $a_y$, if a total number, x, of selected structures is less than a predetermined number, n, of structures to represent the IC design layout, and repeating the steps of determining which structure contributes the most points to each bin, and selecting the determined structures until x equals n; specifying an image parameter space of image parameters for the n selected structures; optimizing a redundancy in the image parameter space of measurement sites for the n selected structures; and calibrating an OPC model for the IC design layout based on the optimized redundancy.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION ON THE DRAWINGS

Figure 3:
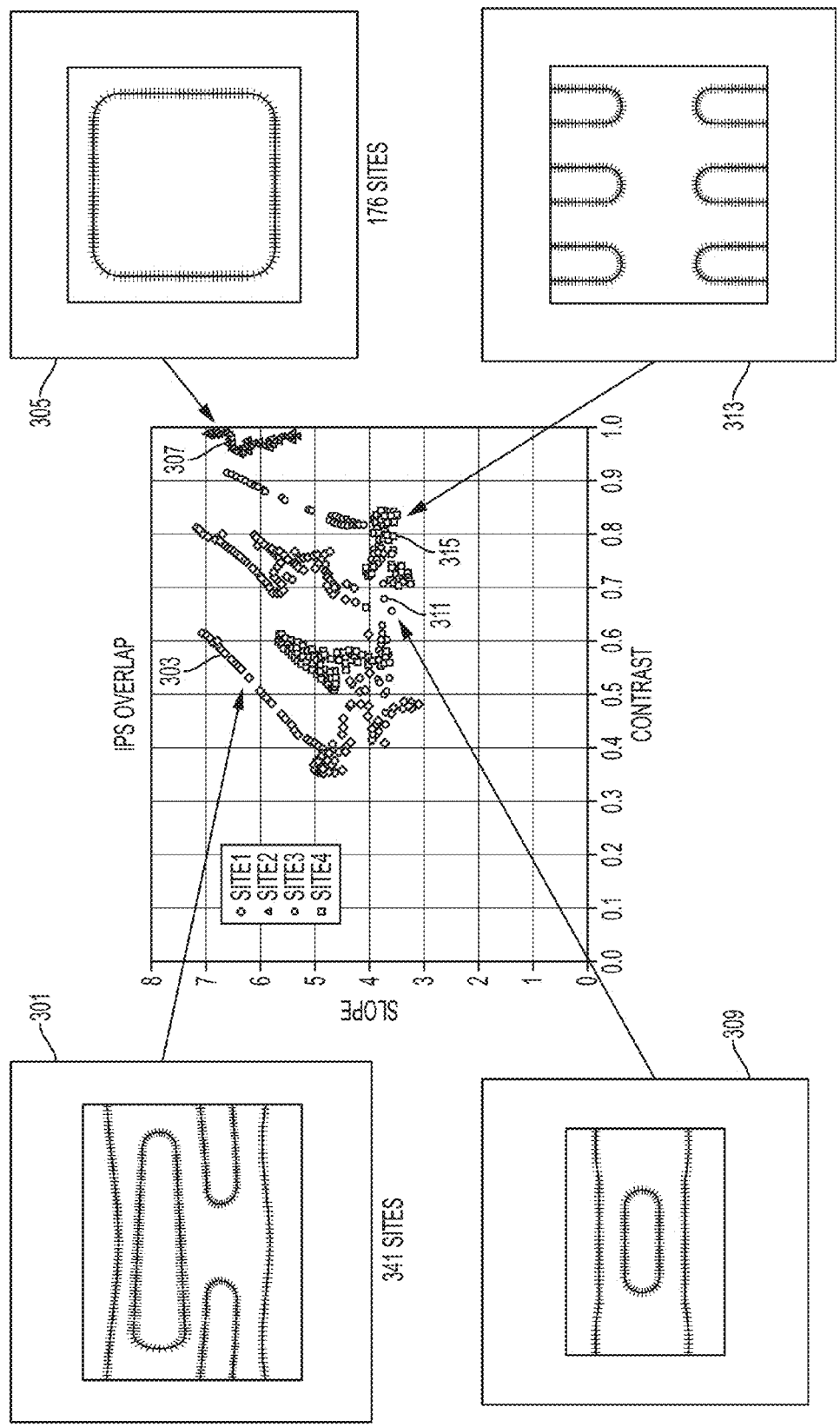
Figure 4:
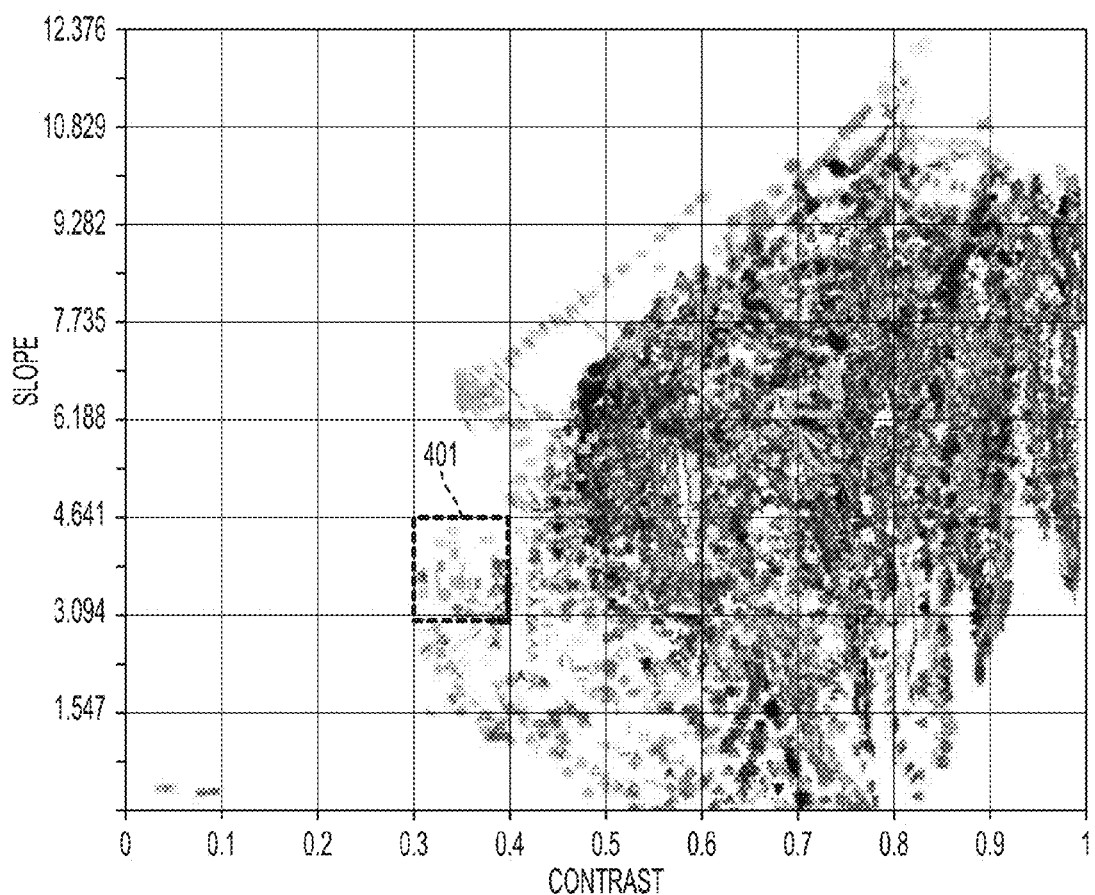
Figure 5A:
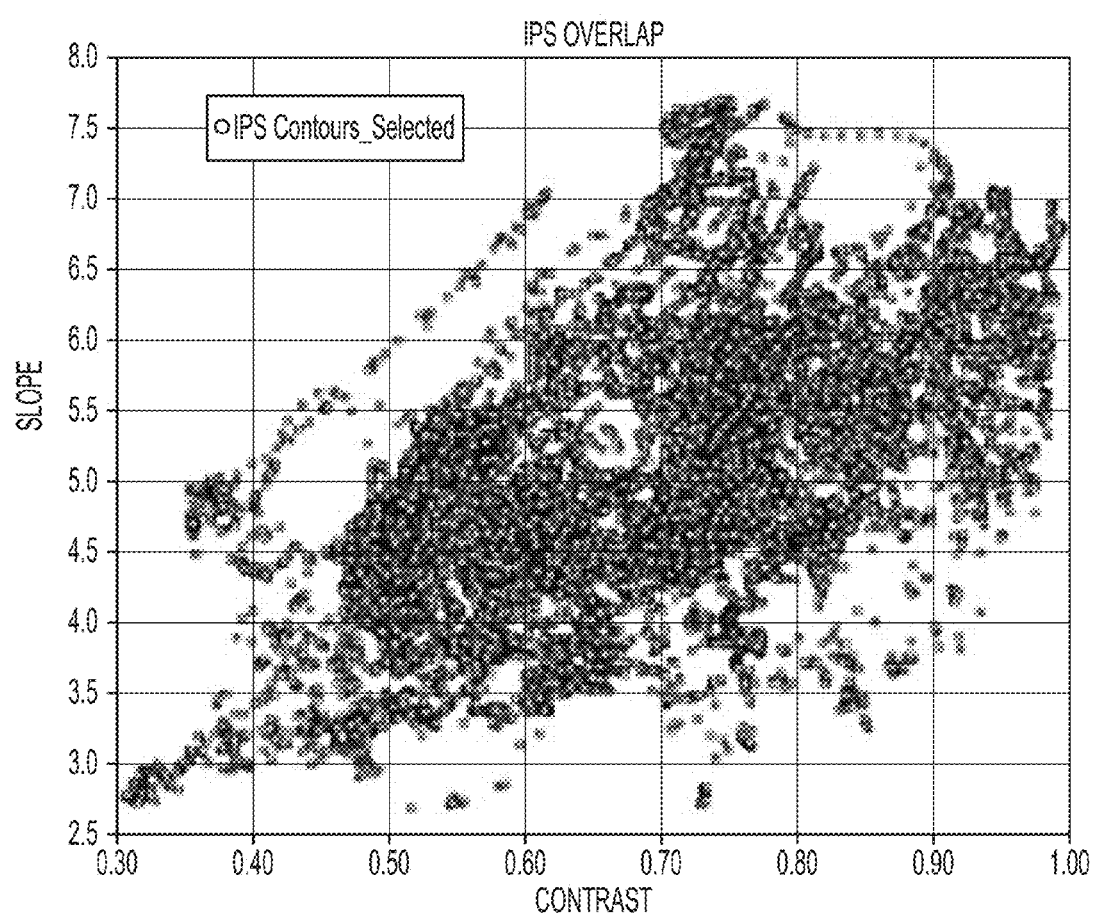
Figure 5B:
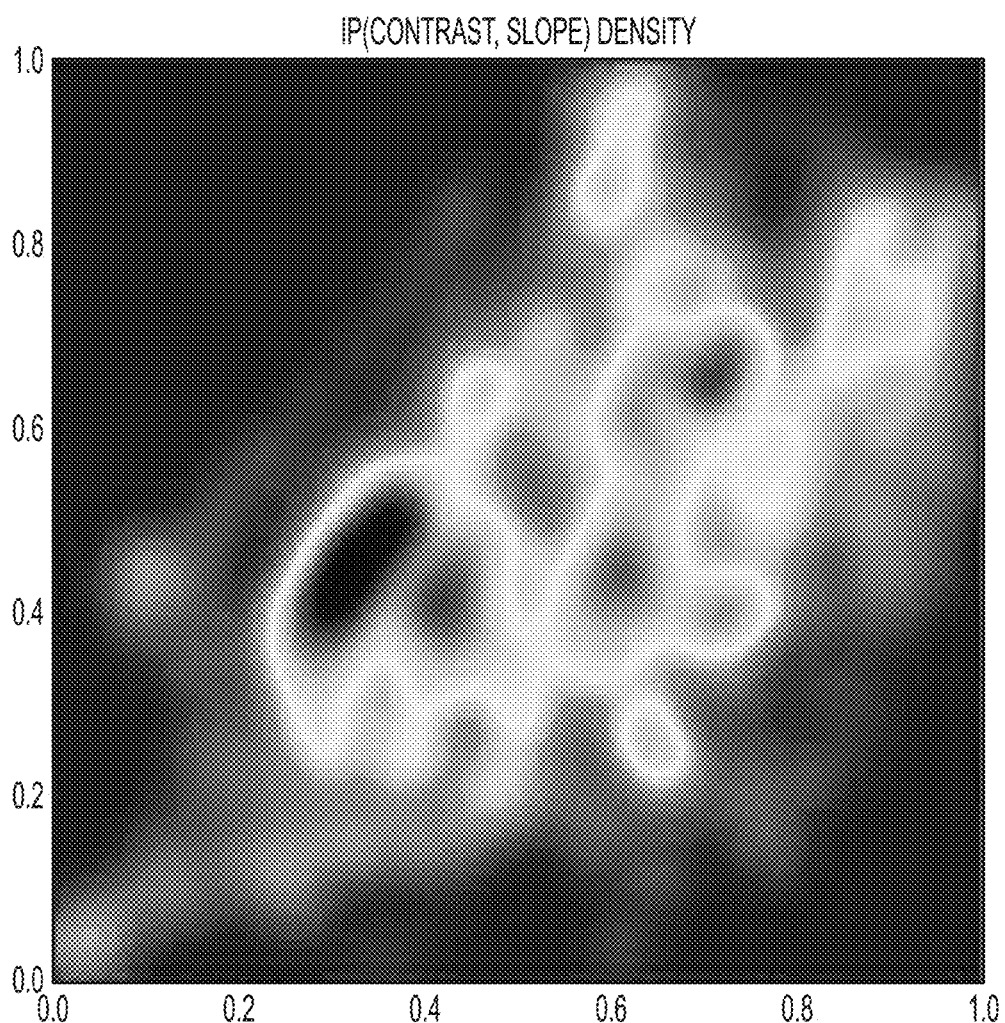
Figure 5C:
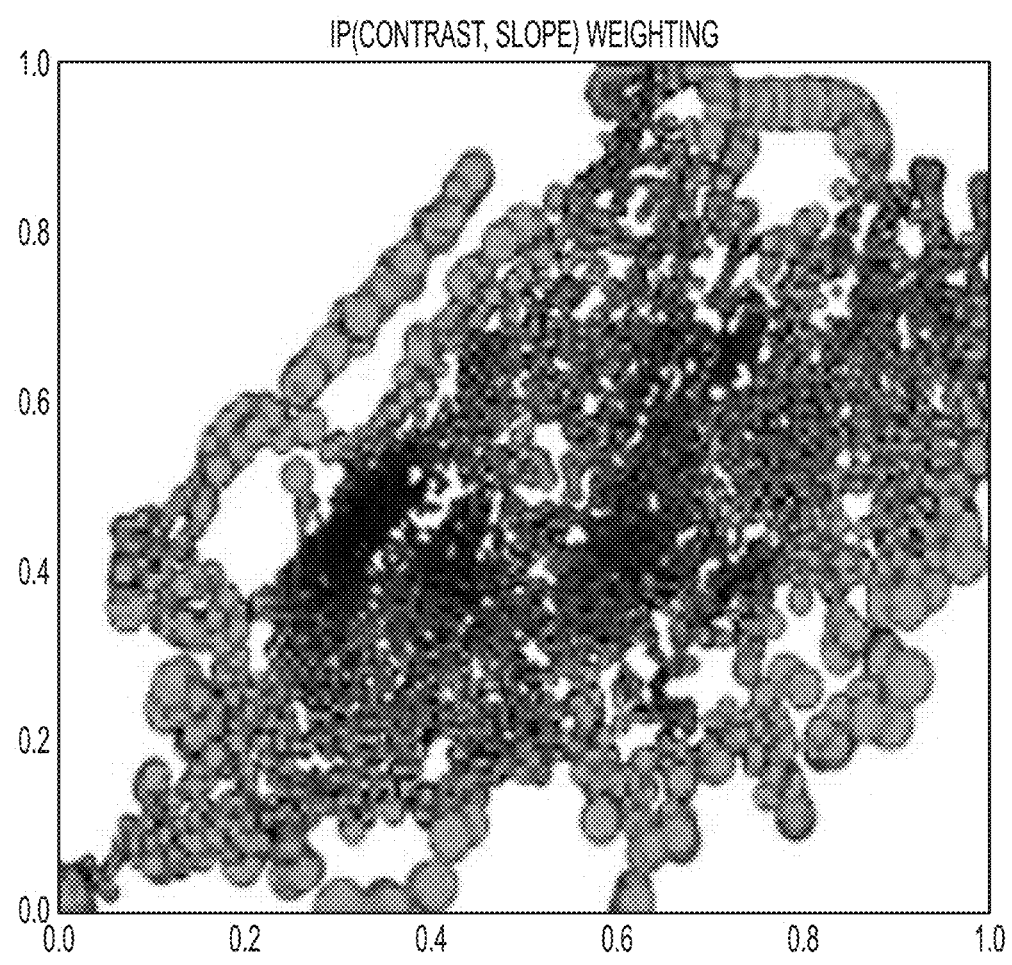

The present disclosure is illustrated by way of example, and not by way of limitation, in the figures of the accompanying drawing and in which like reference numerals refer to similar elements and in which:

FIGS. 1A and 1C schematically illustrate SEM-CD based metrology and a corresponding simulation cutline, and FIGS. 1B and 1D schematically illustrate SEM contour based metrology and corresponding simulation cutlines;

FIG. 2 schematically illustrates the light intensity distribution extracted along a simulation cutline;

FIG. 3 schematically illustrates the overlay of image parameter sites of 4 different structures;

FIG. 4 schematically illustrates the image parameters of all the available structures, in a grid, which is put on the image parameter space to define bins inside each of which the structure with much points is selected; and FIGS. 5A through 5C schematically illustrate strategy to assign weight to each site.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problem of the inaccuracy the way photomask shapes print after resist development. In accordance with embodiments of the present disclosure, an inter-structure coarse selection of the evaluation sites for the calibration of the OPC model through calculating evaluation cutlines is performed, followed by the intra-structure fine selection of the sties that optimize the redundancy of all the sites collected during the first step.

Methodology in accordance with embodiments of the present disclosure includes calculating simulated contours of one or more structures representing an IC design layout; calculating evaluation cutlines along the simulated contours, each cutline corresponding to an evaluation site; selecting a predetermined number, n, of structures representing the ID design layout; extracting one or more image sites parameters for the evaluation cutlines; optimizing a redundancy in the image parameter space of measurement sites for the n structures; and calibrating an OPC model for the ID design layout based on the optimized redundancy.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and descriptions are to be regarded as illustrative in nature, and not as restrictive.

For each structure, cutlines are calculated similar to FIG. 1B, except that reference simulated contours close to the resist edges are employed for setting the cutlines instead of design or mask polygons. This guarantees that the simulation cutline is always perpendicular to the resist edge and centered to it. The number of cutlines can be customized by the sampling of the contour, with typical sampling values being between 1 and 10 nm. Each cutline corresponds to an evaluation site for the calibration or fit of the OPC model. After calculating evaluation cutlines along the simulated contours inside a region of interest matching the SEM metrology window, the light intensity distribution 201 is extracted along a simulation cutline, as illustrated in FIG. 2. As shown, the light intensity distribution 201 has a maximum at 203, a minimum at 205, a slope calculated at 207, and a curvature calculated at 209, in which the maximum and minimum values are detected within a search range around the center of the cutline. Image parameters are derived from the shape of this distribution in the vicinity of the evaluation site for characterization.

After extracting the light intensity distribution, two sequential steps, inter-structure coarse selection and intra-structure fine selection, are performed to optimally select the best sites. The first step defines which structures are to be measured with SEM. The objective is to select from a very large pool of structures (such as 500 to 1000) only a limited number, n, eligible for SEM measurement, where n is expected to be about 1/10 the original number. The n structures are the ones whose combination gives the broadest coverage in an image parameter space.

To accomplish inter-structure coarse selection, a type of grid clustering is applied. For explanatory convenience, the description will be limited to two dimensions (i.e., only two parameters are extracted from the image), but the process applies to any number of dimensions. In this description, as illustrated in FIG. 3, slope 207 from FIG. 2 and contrast are calculated as image parameters in an image parameter space. Contrast is defined as (Imax 203−Imin 205)/(Imax 203+Imin 205). For each structure, there are hundreds of points that are unequally distributed in the space. Applying a simple grid clustering to select the minimum n structures covering the IP space will not work because a single structure supplies sites that can span over multiple portions, or bins, in the grid. Therefore, an iterative process is used to find for each non empty bin in the IP space, the structure supplying the most points, or rather the most representative structure for this region. Then the size of the grid is modified to result in the desired number, n, of structures. During the process, the definition of the grid may change, adapting to the density point.

For example, as illustrated in FIG. 3, image parameter sites of all the structures are overlayed, with only four being shown for explanatory purposes. The structure 301 has 341 sites which are illustrated by the diamonds 303 in the image parameter space; the structure 305 has 176 sites 307 which are illustrated by the triangles in the image parameter space; structure 309 has sites 311 illustrated by circles; and structure 313 has sites 315 illustrated by squares. Sites from different structures sometimes overlap.

Adverting to FIG. 4, after operation of the overlaying step of image parameter sites, the image parameters of all available structures are mapped in an image parameter space. An advanced grid clustering method is introduced. A grid is put on the IP space to define bins (for example a×b bins, for a 2-dimensional space with only two parameters in the image space, where the desired number of structures, n, is less than or equal to a×b) inside each of which the structure with broadest coverage is selected. Note that for y parameters in the image space, a grid of $a_1 \times a_2 \times \ldots \times a_y$ would be put on the IP space to define bins. The size of the grid can be adjusted. For each non-empty bin 401, list the number of counts of a given structure, and find the structure with the most counts. That structure is selected to represent the bin. If the total number, x, of structures selected is less than the predetermined number, n, increase the number of the bins (i.e. change the size of the grid), and repeat the steps until x is equal or approximately equal to n.

After all structures to be measured by SEM are selected coarsely, and SEM measurement is conducted for all structures, the second step is to optimize weighting of sites available in the SEM dataset, or rather to optimize the redundancy of all the sites collected during the first pass, where n structures are selected. The basic idea is to use all the sites available and assign to each one a weight inversely proportional to the redundancy of this site in the IP space. The second idea is to measure the redundancy of a give site by evaluating the density of other sites in its vicinity.

As illustrated in FIG. 5B, the site density at point $(x_0, y_0)$ in the IP space of FIG. 5A can be a symmetric and decreasing function. It can be estimated, for example, by convolving each point in the IP space with a Gaussian of given width $(\sigma_x, \sigma_y)$ as follows:

$$d(x_0, y_0) = (S \otimes G)(x_0, y_0) = \qquad \text{Equation 1}$$
$$\int\int S(x_0 - x, y_0 - y) \frac{1}{2\pi\sigma_x\sigma_y} e^{-\left(\frac{x^2}{2\sigma_x^2} + \frac{y^2}{2\sigma_y^2}\right)} dx dy$$

where:
x, y are coordinates in the IP space,
$x_0, y_0$ are coordinates of the point in the IPS space where the density is evaluated,
S(x,y) is an IP Space filling function which equals 1 at the coordinates of each site, 0 otherwise,
$G(\sigma_x, \sigma_y)$ is a Gaussian function, and
$d(x_0, y_0)$ is a point density function at point $(x_0, y_0)$.
Alternatively, the function to compute the point density may be any other symmetric and decreasing function like Lorentzian.

As illustrated in FIG. 5C, the weight of each site is then computed in inverse proportion to the density function. The only constraint to the function is that it must be monotonous and decreasing. A possible function that gives weighting values between 1 and n, for example, can be:

$$w(x_0, y_0) = \frac{n}{1 + (n-1) * \frac{d(x_0, y_0)}{d_{max}}}$$

where:
dmax is the maximal density function of all sites evaluated in the IP space, and n is the maximal weight.
The overall weighting process is driven by the shape of the convolution Gaussian $(\sigma_x, \sigma_y)$ and the definition of the weighting function.

The embodiments of the present disclosure can achieve several technical effects including optimally selecting and weighting evaluation sites for an OPC model calibration, correcting any bias in the model calibration due to any inadequate site sampling in the image parameter space, and thus, improving the quality of the OPC model. In addition, weighting keeps all the sites or measurements available and hence uses all the data available, thereby obtaining good statistics and reducing the overall uncertainty, and also uses the best SEM data. Furthermore, the method optimally locates the cutline on the simulated contour instead of the design layer. Devices formed in accordance with embodiments of the present disclosure enjoy utility in various industrial applications, e.g., microprocessors, smart phones, mobile phones, cellular handsets, set-top boxes, DVD recorders and players, automotive navigation, printers and peripherals, networking and telecom equipment, gaming systems, and digital cameras. The present disclosure therefore enjoys industrial applicability in any of various types of highly integrated semiconductor devices.

In the preceding description, the present disclosure is described with reference to specifically exemplary embodiments thereof. It will, however, be evidence that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concepts as expressed herein.

What is claimed is:

1. A method comprising:
   selecting a predetermined number, n, of structures representing an integrated circuit (IC) design layout eligible for SEM measurement;
   specifying an image parameter space of image parameters for the n structures;
   optimizing a redundancy in the image parameter space of measurement sites for the n structures;
   calibrating an optical proximity correction (OPC) model for the IC design layout based on the optimized redundancy; and
   manufacturing an IC based on the calibrated OPC model, wherein the selecting step comprises:
   calculating simulated contours of one or more structures representing the IC design layout;
   calculating evaluation cutlines along the simulated contours;
   extracting one or more image parameters for the evaluation cutlines;
   overlaying the image parameter space with a grid of $a_1 \times a_2 \times \ldots \times a_y$ bins (where y represents a number of the image parameters extracted);
   mapping the image parameters of all structures representing the IC design layout;
   determining for each non-empty bin which structure contributes the most points to the bin; and
   selecting for each non-empty bin the determined structure.

2. A method according to claim 1, comprising optimizing by assigning a weight to each site which is inversely proportional to the redundancy.

3. A method according to claim 2, comprising determining the redundancy according to a symmetric and decreasing site density function.

4. A method according to claim 1, wherein if a total number, x, of determined structures is less than n, changing $a_1$ through $a_y$, repeating the steps of determining which structure contributes the most points to each bin, and selecting the determined structures until x equals n.

5. A method according to claim 1, wherein the simulated contours are associated with an SEM metrology window.

6. A method according to claim 1, further comprising: determining a number of the evaluation cutlines to calculate by sampling the simulated contours using a predetermined sampling value.

7. A method according to claim 6, wherein the sampling value ranges from 1 to 10 nanometers (nm).

8. A method comprising:
   calculating simulated contours of one or more structures representing an IC design layout;
   calculating evaluation cutlines along the simulated contours;
   extracting one or more image parameters for the evaluation cutlines;
   overlaying an image parameters with a grid of $a_1 \times a_2 \times \ldots \times a_y$ bins (where y represents a number of the image parameters extracted);
   mapping the image parameters of all structures representing the IC design layout onto the grid;
   determining for each non-empty bin which structure contributes the most points to the bin;
   selecting for each non-empty bin the determined structure;
   changing $a_1$ through $a_y$, if a total number, x, of selected structures is less than a predetermined number, n, of structures to represent the IC design layout, and repeating the steps of determining which structure contributes the most points to each bin, and selecting the determined structures until x equals n;
   specifying an image parameter space of image parameters for the n selected structures;
   optimizing a redundancy in the image parameter space of measurement sites for the n selected structures;
   calibrating an OPC model for the IC design layout based on the optimized redundancy; and
   manufacturing an IC based on the calibrated OPC model.

* * * * *